US006986070B2

(12) United States Patent  (10) Patent No.: US 6,986,070 B2
Fujita et al.  (45) Date of Patent: Jan. 10, 2006

(54) MICROCOMPUTER THAT COOPERATES WITH AN EXTERNAL APPARATUS TO BE DRIVEN BY A DRIVE SIGNAL

(75) Inventors: Yoichi Fujita, Toyoake (JP); Shuichi Nitta, Kariya (JP); Shinichi Senoo, Kariya (JP); Yasuaki Saito, Okazaki (JP)

(73) Assignee: Denso Corporation, Kariya (JP)

( * ) Notice: Subject to any disclaimer, the term of this patent is extended or adjusted under 35 U.S.C. 154(b) by 525 days.

(21) Appl. No.: 10/022,794

(22) Filed: Dec. 20, 2001

(65) Prior Publication Data

US 2002/0095494 A1  Jul. 18, 2002

(30) Foreign Application Priority Data

Dec. 28, 2000 (JP) .............................. 2000-402422
Dec. 28, 2000 (JP) .............................. 2000-402423
Dec. 28, 2000 (JP) .............................. 2000-402425

(51) Int. Cl.
*G06F 1/30* (2006.01)
*G06F 1/04* (2006.01)

(52) U.S. Cl. ...................... 713/322; 713/323; 713/601
(58) Field of Classification Search ................ 713/322, 713/323, 320, 601, 501, 502
See application file for complete search history.

(56) References Cited

U.S. PATENT DOCUMENTS

| 4,427,302 | A | * | 1/1984 | Watanabe ................... 368/200 |
| 5,365,183 | A | | 11/1994 | Mitsuhira |
| 5,448,774 | A | * | 9/1995 | Yokozaki et al. ........ 455/343.5 |
| 5,729,722 | A | | 3/1998 | Matsumoto |
| 5,737,588 | A | | 4/1998 | Maeda et al. |
| 6,198,820 | B1 | | 3/2001 | Tetsushi |

FOREIGN PATENT DOCUMENTS

| JP | U-58-101233 | 7/1983 |
| JP | U-S58-101233 | 7/1983 |
| JP | A-S61-18021 | 1/1986 |
| JP | A-62-189520 | 8/1987 |
| JP | A-64-059551 | 3/1989 |
| JP | A-64-88615 | 4/1989 |
| JP | A-3-175518 | 7/1991 |
| JP | B2-3030878 | 9/1992 |
| JP | A-H04-348410 | 12/1992 |
| JP | A-7-84666 | 3/1995 |
| JP | 07295956 A | * 11/1995 |
| JP | A-8-063451 | 3/1996 |
| JP | A-9-114560 | 5/1997 |

(Continued)

OTHER PUBLICATIONS

Ishikawa et al, A Miniaturized Low-Power Synthesizer Module with Automatic Frequency Stabilization, 1992, IEEE, pp. 752-755.*

(Continued)

*Primary Examiner*—Chun Cao
*Assistant Examiner*—Suresh K Suryawanshi
(74) *Attorney, Agent, or Firm*—Posz Law Group, PLC (57) ABSTRACT

A microcomputer comprises an intermittent operation control section for intermittently operating a CPU. Moreover, the microcomputer comprises a timer block, a level detecting circuit or a timer interlocking control section as the circuits for assisting operation of the CPU. The CPU realizes a timer function with the timer block. The CPU can start the process in response to a level of an external signal with the level detecting circuit. The CPU can start operation with the timer interlocking control section after an external apparatus is driven. With the structure explained above, power consumption of the microcomputer is reduced.

19 Claims, 9 Drawing Sheets

FOREIGN PATENT DOCUMENTS

| | | |
|---|---|---|
| JP | A-9-153854 | 6/1997 |
| JP | A-10-107730 | 4/1998 |
| JP | A-H10-145446 | 5/1998 |
| JP | A-10-161780 | 6/1998 |
| JP | A-H11-273380 | 10/1999 |
| JP | A-H11-355198 | 12/1999 |
| JP | A-2000-039937 | 2/2000 |

OTHER PUBLICATIONS

Notice of Rejection/Communication from Japanese Patent Office in Japanese application No. 2000-402423 which is a counterpart Japanese application of U.S. Appl. No. 10/022,794 (English translation attached) mailed on Aug. 16, 2005.

* cited by examiner

MICROCOMPUTER THAT COOPERATES WITH AN EXTERNAL APPARATUS TO BE DRIVEN BY A DRIVE SIGNAL

CROSS-REFERENCE TO RELATED APPLICATION

This application is based on Japanese Patent Applications No. 2000-402422 filed on Dec. 28, 2000, No. 2000-402423 filed on Dec. 28, 2000 and No. 2000-402425 filed on Dec. 28, 2000 the contents of which are incorporated herein by reference.

BACKGROUND OF THE INVENTION

1. Field of the Invention

The present invention relates to a microcomputer.

2. Description of the Related Art

As an electronic control unit (ECU) utilizing a microcomputer, there is provided a unit of the same type which executes the predetermined processes after a constant time has passed from the predetermined time. Measurement of such constant time is called a timer process, while a function including the timer process which is executed by the microcomputer is called a timer function. For example, such function may be realized by an ECU which executes necessary communication with a communication partner after the predetermined time has passed from transmission of a drive signal to an apparatus of the communication partner or by an ECU which executes operations for driving an electrical load such as a lamp or a buzzer or the like after the predetermined time has passed from detection of change of a signal from an external switch or the like into an active level. However, such timer process essentially requires continuous measurement of time which results in large power consumption of the microcomputer.

Meanwhile, a certain ECU continuously monitors an external signal level of a microcomputer to realize a signal interlocking function with which the predetermined process is executed when a signal level reaches the predetermined level. However, such continuous monitor of signal level with the microcomputer requires a large amount of power consumption of this microcomputer. Moreover, for the monitoring of signal level, a noise canceling process also requires a large amount of power consumption.

On the other hand, another ECU is provided with a communication function executing the process through communication with the other ECU or the like. However, such communication may be realized after a certain waiting period for communication to prepare for a communication partner or a communication device. Therefore, power consumption of a microcomputer increases during such preparation period.

For example, in the case of an ECU which will be loaded to a vehicle, since a battery is not charged when an engine stops, such ECU with a microcomputer which requires a large amount of power consumption usually exhausts a battery.

SUMMARY OF THE INVENTION

An object of the present invention is to reduce power consumption of a microcomputer.

Another object of the present invention is to reduce power consumption of a microcomputer with a structure which may be employed rather easily. The other object of the present invention is to reduce power consumption of a microcomputer through a structure which may be realized at a low cost.

It is still another object of the present invention to provide a microcomputer which implements a timer function with lower power consumption.

It is an additional object of the present invention to provide a microcomputer which implements, for a long period of time, a timer function with lower power consumption.

It is more additional object of the present invention to provide a microcomputer which implements a signal interlocking function with lower power consumption.

It is still more additional object to provide a microcomputer which implements a communication function with lower power consumption.

According to an embodiment profile of the present invention, a microcomputer is provided with a CPU which operates depending on programs, a main-clock generating means for generating a main-clock to operate the CPU and an intermittent operation control means which operates by receiving a sub-clock that is lower than the main-clock in the frequency for controlling intermittent operation of the CPU.

This CPU outputs, when it stops the operation thereof by itself, outputs a stop command to the intermittent operation control means. The intermittent operation control means stops the operation of the main-clock generating means in response to the stop command and starts measurement of the predetermined setting time. The intermittent operation control means restarts, after the preset time has passed, operation of the main-clock generating means in order to raise the CPU to the operating condition from the stop condition.

An intermittent time measuring means is structured so that the period in which the CPU is in the stop condition (hereinafter, referred to as intermittent time) is automatically measured and such measured value can be read by the CPU. Thereby, the CPU can measure a very longer period such as several tens of hour and several days and moreover can reduce power consumption.

According to another embodiment profile of the present invention, the microcomputer is provided with an automatic signal reading means (level detecting circuit). This automatic signal reading means intermittently reads and determines, when the CPU is in the stop condition, level of a binary signal as the monitor object (hereinafter, referred to as a monitor object signal) supplied to the predetermined input terminal of the relevant microcomputer. When signal level reaches the particular level, this level detecting circuit raises the CPU to the operating condition from the stop condition. As a result, the signal interlocking function is realized with lower power consumption. Moreover, the level detecting circuit has excellent noise-free characteristic in view of intermittently reading the level of monitor object signal.

According to the other embodiment profile of the present invention, the microcomputer is provided with a CPU to execute a communication process and a register for intermittently control the operation of CPU. Owing to this intermittent operation control means, the CPU realizes the intermittent operation in order to reduce power consumption of the microcomputer. Moreover, the microcomputer is additionally provided with a timer interlocking control means to output the drive signal to the communication means depending on the predetermined setting time. The CPU starts the communication process when it is raised by the intermittent operation control means after the predetermined time has passed from the timing where the timer interlocking control means outputs the drive signal. Therefore, an external device can start preparation before the CPU rises and thereby the CPU realizes the communication process only within short waiting time.

BRIEF DESCRIPTION OF THE DRAWINGS

Features and advantages of embodiments will be appreciated, as well as methods of operation and the function of the related parts, from a study of the following detailed description, the appended claims, and the drawings, all of which constitute a part of this application. In the drawings:

DETAILED DESCRIPTION OF PREFERRED EMBODIMENTS

Figure 1:
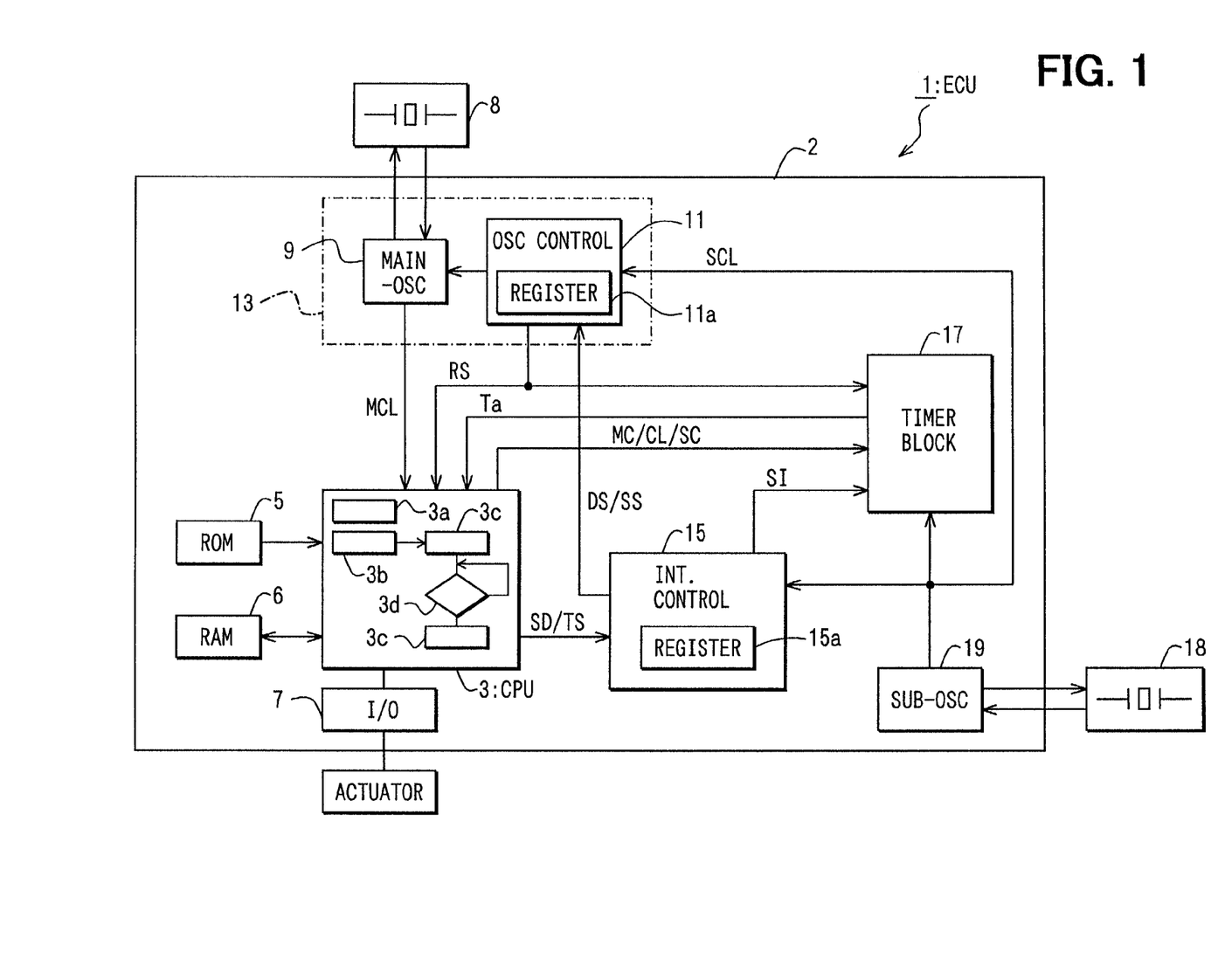
FIG. 1 is a block diagram of a microcomputer depending on a first embodiment of the present invention.

A first embodiment of the present invention will be explained with reference to the accompanying drawings. In this embodiment, the present invention has been adapted to an electronic control unit (ECU) 1 loaded to a vehicle. FIG. 1 is a block diagram of a structure of a microcomputer of this first embodiment. A microcomputer 2 is formed as a single chip. The microcomputer 2 is provided, as a basic structure, with a CPU 3 which operates depending on programs, a ROM 5 for previously storing programs and fixed data and a RAM 6 for temporarily storing a result of arithmetic operation executed by the CPU 3. Moreover, the ECU 1 is provided, as a control object, for example, with an indicator lamp and an actuator, while the microcomputer 2 is provided with an I/O port 7 for an actuator or the like.

The microcomputer 2 is externally provided with a couple of oscillation elements 8, 18. The microcomputer 2 comprises a main oscillation circuit 9 for generating the main-clock MCL (several MHz to several tens of MHz) which is used as the operation clock of the CPU 3, a main-clock generating section 13 including an oscillation control section 11 for controlling the main oscillation circuit 9 and moreover a sub-oscillation circuit 19 for generating a sub-clock SCL (several tens of KHz in this embodiment profile) which is lower than the main-clock in the frequency. The microcomputer 2 comprises an intermittent operation control section 15 for controlling the CPU 3 to execute the intermittent operation in cooperation with the oscillation control section 11 and a timer block 17 for measuring the intermittent time (substantial pause period of the CPU 3).

The oscillation control section 11, the intermittent operation control section 15 and timer block 17 operate by receiving the sub-clock. This sub-clock is always generated. The main oscillation circuit 9 constitutes a main-clock generating means, while the oscillation control section 11 and intermittent operation control section 15 constitute a intermitting operation control means and the timer block 17 constitutes an intermittent time measuring means.

The CPU 3 is capable of suspending own operations by executing a particular operation stop command. When the CPU 3 stops operation thereof by executing the operation stop command, it outputs a stop command SD to the intermittent operation control section 15.

Meanwhile, the intermittent operation control section 15 is provided with a register 15a to which a time ST is stored. The predetermined setting time ST stored in this register 15a is stored by the CPU 3.

Under the normal operation, the intermittent operation control section 15 makes the oscillation control section 11 operate the main oscillation circuit 9 by giving an operation instruction DS to the oscillation control section 11 of the main-clock generating section 13. When the CPU 3 stops the operation and the intermittent operation control section 15 receives the stop command SD from the CPU 3, this intermittent operation control section 15 outputs a stop instruction SS to the oscillation control section 11, causing this oscillation control section 11 to stop the operation of main oscillation circuit 9. The intermittent operation control section 15 simultaneously starts the measurement of setting time ST which is being stored to the register 15a. When the setting time has passed, the intermittent operation control section 15 outputs again the operation instruction DS to the oscillation control section 11, causing this oscillation control section 11 to start again the operation of main oscillation circuit 9. When the intermittent operation control section 15 receives the stop command SD and thereby outputs the stop instruction SS to the oscillation control section 11, this intermitting operation control section 15 outputs, to the timer block 17, a stop informing signal SI indicating that the operation of CPU 3 stops.

The setting time ST is measured on the basis of the number of sub-clocks (namely, frequency). The stop informing signal SI is constituted of one-shot pulse signal having an extremely narrow pulse width.

The oscillation control section 11 switches the operating condition and non-operating condition of the main oscillation circuit 9 depending on the operation instruction DS and stop instruction SS transmitted from the intermittent operation control section 15. When the oscillation control section 11 makes the main oscillation circuit 9 start its operation, this oscillation control section 11 outputs, to the CPU 3, a RUN signal RS to raise the CPU 3 to the operating condition from the stop condition in the timing where the predetermined stable oscillation wait time TF which is assumed to provide stable frequency of the main-clock has passed from such start timing.

The stable oscillation wait time TF is provided to raise the CPU 3 after the frequency of main-clock is surely stabled and is measured on the basis of the number of sub-clocks. The oscillation control section 11 is provided with a register 11a for storing the stable oscillation wait time. Data of the register 11a is stored by the CPU 3. The oscillation control section 11 is structured to continuously output the RUN signal until it receives the next stop instruction from the intermittent operation control section 15. This RUN signal is continuously outputted until the operation of main oscillation circuit 9 is stopped next. Moreover, this RUN signal is supplied to the timer block 17.

The timer block 17 has a couple of operation modes. A first mode thereof is the basic operation mode for automatically measuring an intermitting time of the CPU 3 in conjunction with the intermittent operation of the CPU 3. A second operation mode is the free-running mode for continuously measuring time. The timer block 17 is set to any one of above two operation modes depending on an operation mode switching command MC issued from the CPU 3. A measured value Ta is formed in the format which may be read by the CPU 3. The measured value Ta is read by the CPU 3 as a count value and is then converted to time.

In the timer block 17, the measured value is cleared to 0 in the first mode with the stop informing signal SI sent from the intermittent operation control section 15 and this timer block 17 stops the measuring operation and holds the measured value Ta while the RUN signal RS is outputted from the oscillation control section 11. This timer block 17 clears the measured value Ta with a clear command from the CPU 3 and stops the measuring operation and holds the measured value with a count stop command from the CPU 3.

Figure 2:
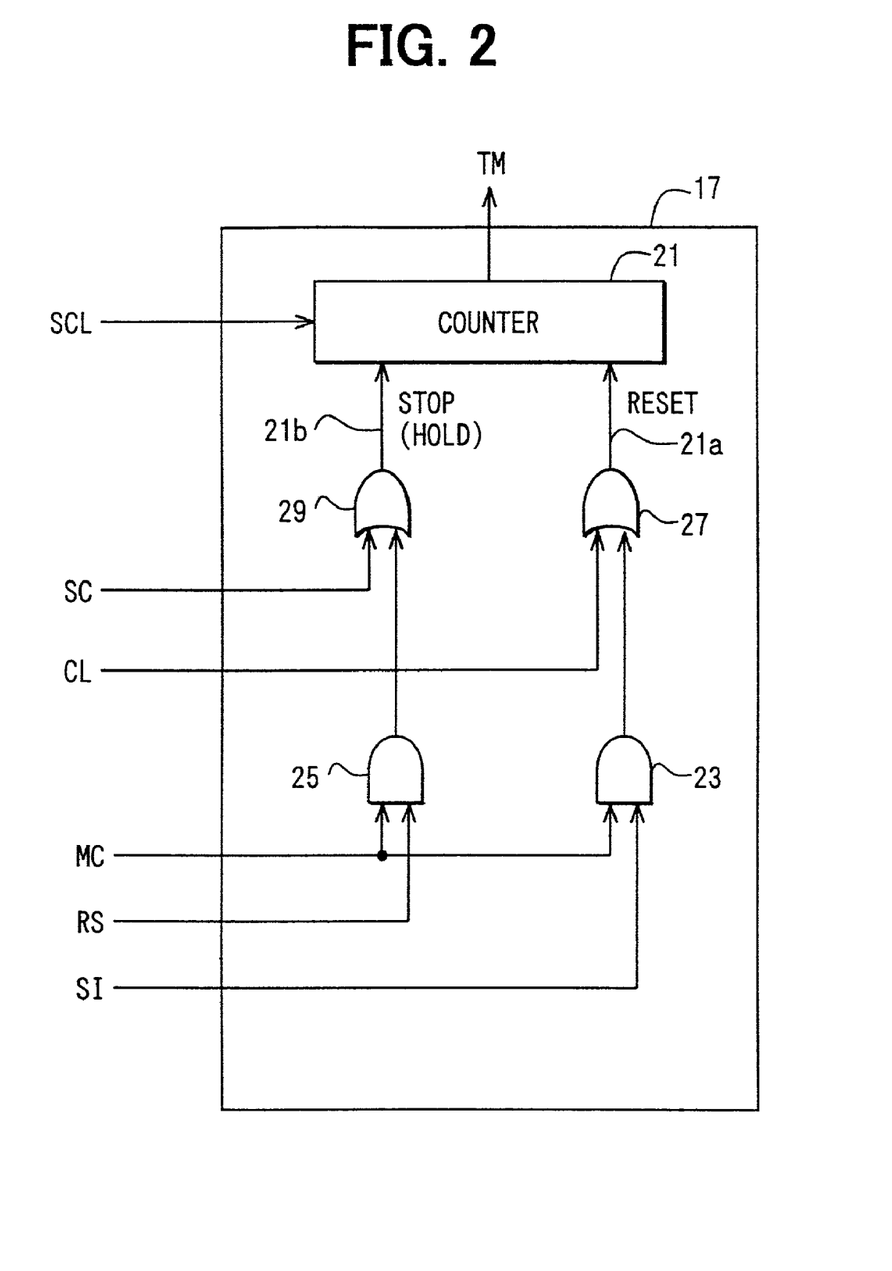
FIG. 2 is a block diagram of a timer block depending on the first embodiment of the present invention.

FIG. 2 shows a practical circuit structure of the timer block 17. The timer block 17 is formed as a logic circuit. This timer block 17 is provided, as a means for measuring time, with a counter 21 which performs the up-count operation by receiving a sub-clock and allows the counted value thereof to be read by the CPU 3 as the counted value Ta. The counter 21 clears the counted value to 0 when a high level signal is supplied to a reset terminal 21a thereof and holds the counted value while a high level signal is supplied to an operation stop terminal 21b.

The timer block 17 is provided with a logic circuit. An AND circuit 23 outputs an AND signal of the signal corresponding to the operation mode switching command sent from the CPU 3 (hereinafter referred to as an operation mode switching signal MC) and the stop informing signal SI sent from the intermittent operation control section 15. An AND circuit 25 outputs an AND signal of the operation mode switching signal MC from the CPU 3 and the RUN signal RS from the oscillation control section 11. An OR circuit 27 supplies an OR signal of an output of the AND circuit 23 and the signal corresponding to a clear command CL from the CPU 3 (hereinafter referred to as a clear signal) to the reset terminal 21a of the counter 21. An OR circuit 29 supplies an OR signal of an output of the AND circuit 25 and the signal corresponding to the count stop command from the CPU 3 (hereinafter referred to as a count stop signal SC) to the operation stop terminal 21b of the counter 21.

Each signal inputted to the timer block 17 turns to the active level when it is in the high level. Here, it is possible to use a circuit which is set to the active level when the signal is in the low level. The clear signal CL to the OR circuit 27 from the CPU 3 is the one-shot pulse signal of extremely narrow pulse width like the stop informing signal SI from the intermittent operation control section 15.

In the timer block 17, when the operation mode switching signal MC from the CPU 3 is in the high level (= logic 1), since the stop informing signal SI from the intermittent operation control section 15 is supplied to the reset terminal 21a of the counter 21 via the AND circuit 23 and OR circuit 27 and the RUN signal RS from the oscillation control section 11 is supplied to the operation stop terminal 21b of the counter 21 via the AND circuit 25 and OR circuit 29, the operation mode of the relevant timer block 17 is set to the first mode.

Figure 3A:
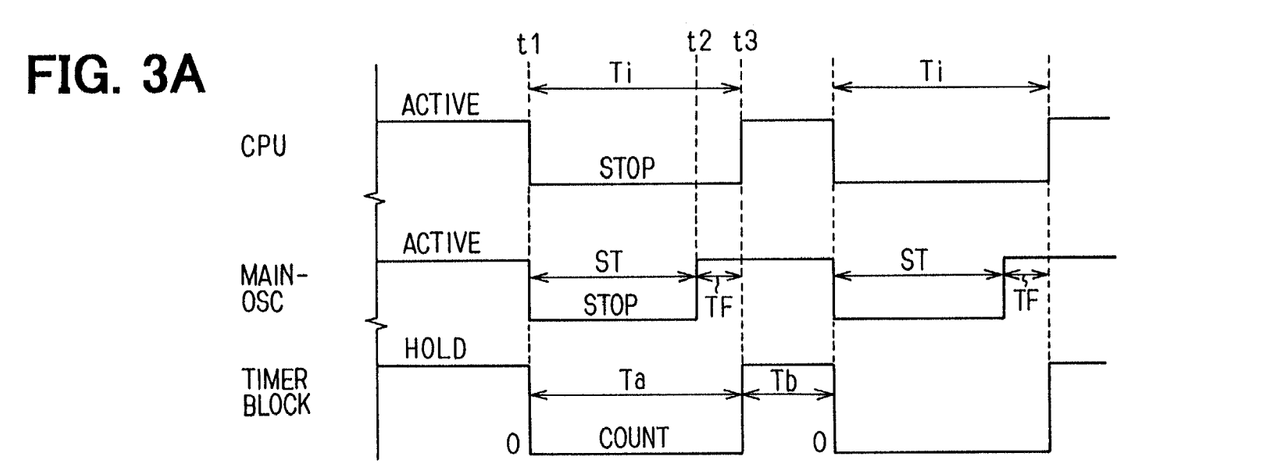
FIG. 3A is a graph showing an operating condition of the microcomputer depending on the first embodiment of the present invention.

In this first mode, the intermittent operation shown in FIG. 3A is performed. When the CPU 3 stops operation and the stop informing signal SI is outputted from the intermittent operation control section 15 at a time t1, the count value of counter 21 is cleared to 0 and the counting operation of the counter 21 is started again from the beginning. When the setting time ST has passed, the main oscillation circuit 9 is set again to the active level at a time t2. Moreover, when the stable oscillation wait time TF has passed, the RUN signal RS is outputted from the oscillation control section 11 at a time t3 and thereby the CPU 3 restarts again the operation thereof. From this timing, the CPU 3 executes the predetermined processes. Until the stop informing signal SI is outputted again, the count operation of counter 21 stops and the count value is held. When the CPU 3 executes the predetermined process and stops again the operation thereof, the operations from the time t1 are repeated. As a result, within only one cycle, the timer block 17 measures a time Ta and the CPU 3 stores the operation period Tb thereof.

When the operation mode switching signal MC from the CPU 3 is in the low level (=logic 0), the operation mode of the timer block 17 is set to the second mode with the AND circuits 23, 25. Without relation to the stop informing signal SI from the intermittent operation control section 15 and the RUN signal from the oscillation control section 11, the counter 21 performs the up-count operation in the free-running condition. When the clear signal CL is outputted from the CPU 3 without relation to operation mode, the count value of counter 21 is cleared to 0. While the count stop signal SC is outputted from the CPU 3, the count operation of counter 21 stops and the count value is held.

The CPU 3 executes a program for setting the desired setting time ST to the register 15a of intermittent operation control section 15 and constitutes a setting means 3a. Moreover, upon determination that that there is no process to be executed and it is possible to stop the operation, the CPU 3 executes an operation stop instruction to stop operation thereof and executes a program for outputting the stop command SD to the intermittent operation control section 15. Thereby, the CPU 3 constitutes a stop means 3b. In addition, the CPU 3 executes a timer function program. The CPU 3 constitutes an accumulating means 3c by executing an accumulation program. The accumulating means 3c obtains an accumulated addition value ($\Sigma$(Ta+Tb)). This accumulated addition value means the total time from the starting time of intermittent operation which has stopped first the operation. The CPU 3 constitutes a determining means 3d to determine passage of time based on the accumulated addition value. Upon determination that the accumulated addition value has reached the time of timer, the CPU 3 stops, to realize the timer function, the intermittent operation and executes the predetermined program 3e to be achieved by the timer function. Whenever the CPU 3 rises, it reads the total intermittent time Ta until it rises this time. Moreover, the CPU 3 measures, with its own software process, the operating time from the rise of this time, namely a time Tb in which the CPU 3 is in the operating condition.

According to this microcomputer 2, since not only the CPU 3 but the main-clock stop and time is measured by the sub-clock of lower frequency which results in comparatively small power consumption, the timer function may be realized with less amount of power consumption. Moreover, although the timer block 17 can continuously measure the time only within a limited period, a very longer timer function assuring the predetermined measuring time (timer time) of several tens of hour or several days is realized.

In addition, the timer time can be set freely with software without any limitation on the flexibility. Moreover, since measurement is realized continuously for a longer period while the CPU 3 is operated periodically, it is possible to change as required the processes during the measurement. For example, if situation changes after the measurement of timer time is started and thereby the operation assumed to be implemented is no longer required, it is possible to detect such condition to execute the other processes. For example, stability of operation of the microcomputer 2 can be confirmed by periodically checking the data or the like within the RAM 6 and thereby reliability is improved.

Moreover, the timer block 17 is capable of setting the operation mode to the second mode with the operation mode switching command MC and is capable of clearing and holding the count value with a command from the CPU 3 in such a case where the operation mode is set at least to the second mode. Therefore, the timer function by the second mode is realized.

Figure 3B:
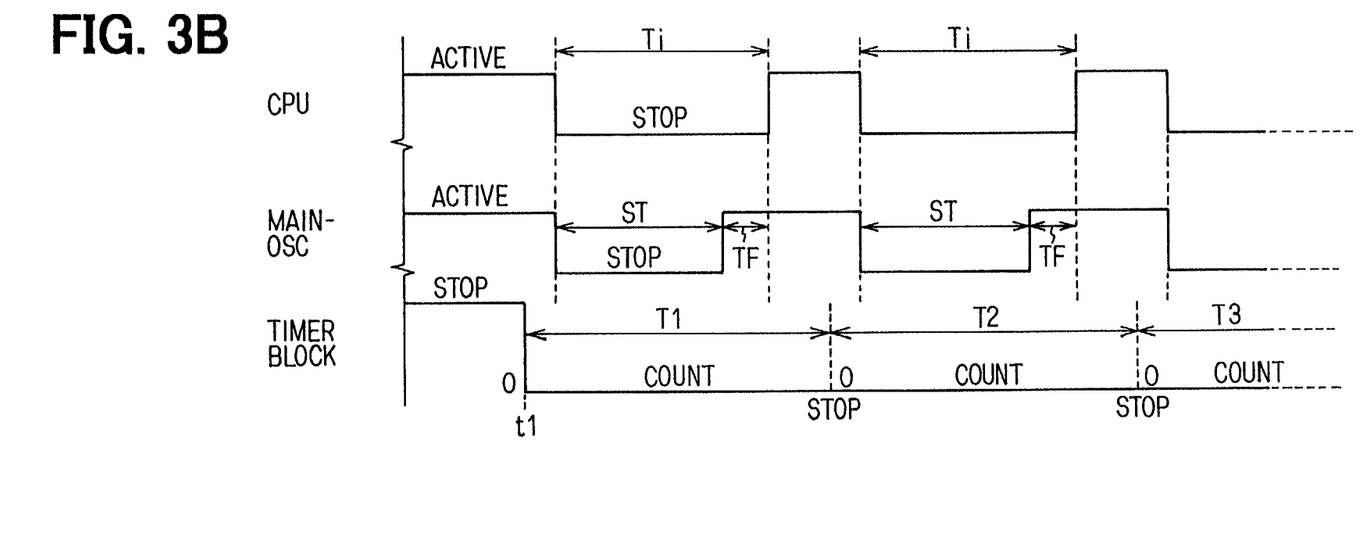
FIG. 3B is a graph showing an operating condition of the microcomputer depending on the first embodiment of the present invention.

The CPU 3 sets, until the time measurement for the timer function is started, the operation mode of the timer block 17 to the second mode with the setting means 3a. As shown in FIG. 3B, the clear signal CL is sent, on the occasion of starting the measurement of time, to the timer block 17 with the stop means 3b at the time t1 in view of clearing the count value of counter 21 to 0. The CPU 3 accumulates, whenever it rises, a measuring time Ti of counter 21 with the accumulating means 3c. The CPU 3 temporarily stops, whenever it rises, the count-up operation of the counter 21 to read the count value of the counter 21 and clears, immediately after reading such count value, the count value of the counter 21 to start again the count operation of counter 21 from 0. As a result, the accumulated addition value ($\Sigma(Ti)$) of T1, T2, ... shown in FIG. 3B is obtained. This accumulated addition value may be used in the determining means 3d. In the second mode operation, a processing load of the CPU 3 is reduced.

In this embodiment explained above, the setting time is programmable but it can be set as the fixed value.

Next, a second embodiment of the present invention will then be explained with reference to FIG. 4 to FIG. 8. The structure similar to that of the first embodiment is given the like reference numeral in order to eliminate duplication of explanation.

Figure 4:
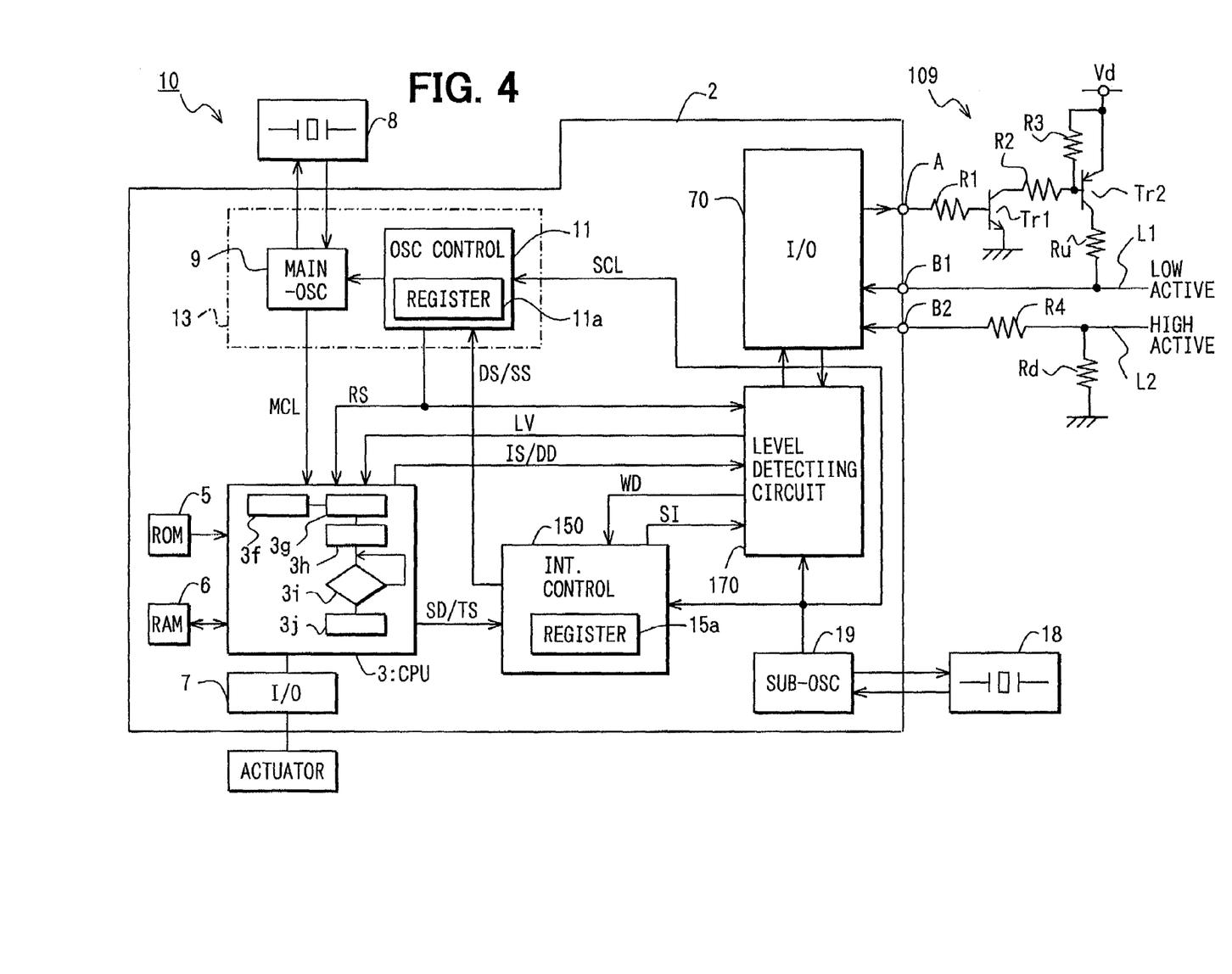
FIG. 4 is a block diagram of the microcomputer of a second embodiment of the present invention.

The ECU 10 implements the predetermined operation, for example, lights a lamp as an actuator when a low active signal as the monitor object signal supplied via a signal line L1 becomes low level.

The signal line L1 is connected to an input terminal B of the single chip type microcomputer 2. Within the ECU 10, a power feeding circuit 109 is provided to feed the signal line L1. The power feeding circuit 109 is connected to the signal line L1 at its one end and includes a pull-up resistor Ru in order to pull up the signal line L1 to a power supply voltage Vd (=5V) corresponding to the high level. The power feeding circuit 109 comprises transistors Tr1, Tr2 as a switching circuit and resistors R1, R2 and R3. The power feeding circuit 109 turns ON the transistor Tr1, when an output terminal A thereof becomes high level, to pull up the signal line L1.

The microcomputer 2 comprises an intermittent operation control section 150 and a level detecting circuit 170. The intermittent operation control section 150 is structured to input a rise request WD from the level detecting circuit 170 in addition to the intermittent operation control section 150 of the first embodiment. The level detecting circuit 170 operates depending on a command from the CPU 3 to perform, for every constant period, the process to read the signal level via an I/O port 70 from a terminal of the microcomputer 2. The intermittent operation control section 150 and level detecting circuit 170 operate by receiving a sub-clock which is always generated from a sub-oscillation circuit 19. The level detecting circuit 170 corresponds to the automatic signal reading means and the oscillation control section 11 and intermittent control section 150 correspond to a timer rise control means.

The CPU 3 can stop the operation thereof by executing a particular operation stop instruction. Thereby, the CPU 3 issues, when it stops the operation thereof by itself with execution of the operation stop instruction, an operation request RQ to the intermittent operation control section 150.

The intermittent operation control section 150 stops operation of the main oscillation circuit 9 until the level detecting circuit 170 outputs a rise request explained later in the case where the setting time ST being stored to the register 15a is 0 when a stop instruction SS is outputted to the oscillation control section 11 by receiving an operation request from the CPU 3. The intermittent operation control section 150 outputs, upon output of a rise request from the level detecting circuit 170, an operation instruction DS to the oscillation control section 11 to instruct the oscillation control section 11 to start again the operations of the main oscillation circuit 9 and the CPU 3. The CPU 3 stores 0 to the register 15a when the predetermined conditions are satisfied by executing a stop and hold program and holds itself in the stop condition until a rise request WD is outputted from the level detecting circuit 170.

Moreover, the intermittent operation control section 150 outputs an operation instruction DS to the oscillation control section 11 to instruct the oscillation control section 11 to start again the operations of the main oscillation circuit 9 and the CPU 3 even in the case where a rise request WD is issued from the level detecting circuit 170 during the measurement of the setting time being stored to the register 15a.

Figure 5:
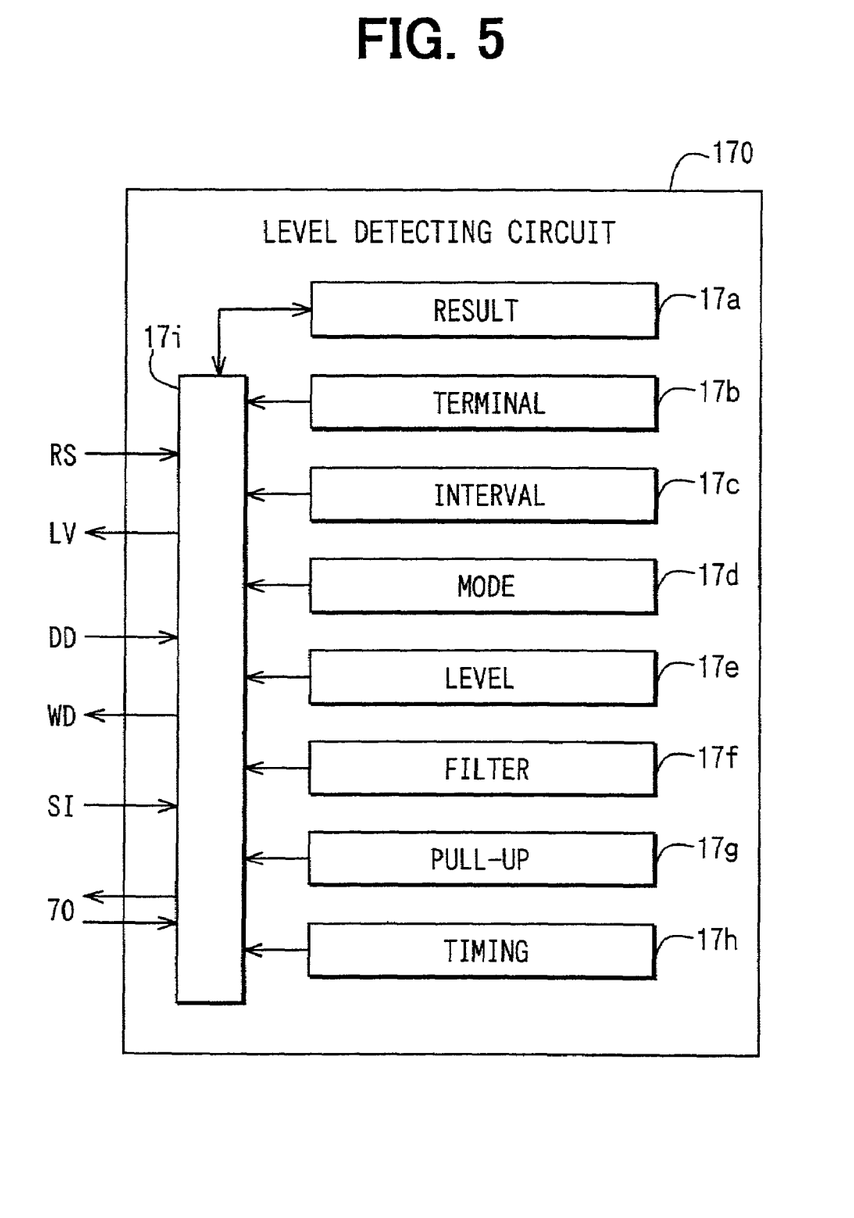
FIG. 5 is a block diagram of a level detecting circuit depending on the second embodiment of the present invention.

Next, the level detecting circuit 170 will be explained with reference to FIG. 5. The level detecting circuit 170 is constituted of a logic circuit. A reading result storage section 17a can read the stored content by the CPU 3. To a storage section 17b, read terminal command information indicating a terminal with which the level detecting circuit 170 reads a signal level among a plurality of input terminals of the microcomputer 2 is stored by the CPU 3. To a storage section 17c, a signal read interval Tk which is identical to a time interval for intermittently implementing the read operation of signal level is stored by the CPU 3.

A processing circuit section 17i once reads a signal level of the read object terminal indicated by the storage section 17b for every constant period Tk indicated by the storage section 17c to determine whether such signal level is high or low. Thereby, the processing circuit section 17i stores the determined level to the reading result storage section 17a by updating the old level. For example, read terminal command information indicating an input terminal B1 is stored into the storage section 17b.

Moreover, various information pieces to determine operation content of the level detecting circuit 170 are stored by the CPU 3 into the other storage sections 17d to 17h.

To the storage section 17d, mode command information of one bit to set the operation mode of the level detecting circuit 170 is stored by the CPU 3. Here, the operation mode of the level detecting circuit 170 is selected from the wake-up operation mode to operate the level detecting circuit while the CPU 3 stops in order to raise the CPU 3 when a determining level of the signal at the read object terminal reaches the particular level and the free-running operation mode to operate the level detecting circuit in parallel to the CPU 3 while it is operating. To the storage section 17e, the particular level for raising the CPU 3 in the wake-up operation mode is stored by the CPU 3. For example, a value indicating the wake-up operation mode is stored to the storage section 17d and a low level is stored to the storage section 17e, respectively.

When the storage section 17d indicates the wake-up operation mode, the processing circuit section 17i starts its operation in the timing that the CPU 3 stops its operation and the intermittent operation control section 15 outputs the stop informing signal SI. The processing circuit section 17i reads once the signal level at the read object terminal in every constant period Td to determine the level and updates and stores such determining level into the storage section 17a. When the determining level matches with the particular level indicated by the storage section 17e, the processing circuit section 17i outputs the rise request WD to the intermittent operation control section 15 to start again the operation of the main oscillation circuit 9 and raise the CPU 3 to the operating condition from the stop condition. The level detecting circuit 170 determines, upon output of the RUN signal from the oscillation control section 11, that the CPU 3 has started again its operation and thereafter stops the operation thereof.

When the storage section 17c indicates the free-running mode, the level detecting circuit 170 operates depending on an operation command DD from the CPU 3 to perform the basic operation explained above. That is, this level detecting circuit 170 once reads the signal level at the read object terminal in every constant period Tk to determine the signal level and thereafter updates and stores the determining level to the read result storage section 17a.

To a storage section 17f, filter process command information of one bit to set the YES/NO condition of filter process function is stored by the CPU 3. To a storage section 17g, power feeding signal output control command information of one bit to set the YES/NO condition of power feeding signal output control function is stored by the CPU 3. To a storage section 17h, a signal read timing period Tm (wait time) for executing the power feeding signal output control is stored by the CPU 3.

The processing circuit section 17i performs a filter process for noise-free operation, even in any operation mode, when the storage section 17f indicates the YES condition of filter process function. The read result storage section 17a is updated by the filter process only when the same determining level is continuously detected for a plurality of predetermined times, for example, two times. When the storage section 17f indicates the NO condition of filter process function, the read result storage section 17a is updated without any filter process.

The time 50 ms, for example, is stored as the signal read interval Tk, for example, to the storage section 17c. A value indicating the YES condition of filter process function is stored to the storage section 17f. For example, to the storage section 17g, a value indicating the YES condition of power feeding signal output control function is stored because the monitor object signal is a low active signal. For example, to the storage section 17h, a value a little longer than the delay time until the condition of the signal line L1 is electrically stabled from output of the high level power feeding signal from the microcomputer 2 is stored as a time Tm.

When the storage section 17g indicates the YES condition of power feeding signal output control function, a high level power feeding signal is outputted from an output terminal A in such a timing only the signal read timing period Tm indicated by the storage section 17h before the timing to read a signal level from the read object terminal. The high level power feeding signal turns ON an NPN transistor Tr1 of the power feeding circuit 109. Output of the power feeding signal stops after the signal level is read from the read object terminal.

Figure 6A:
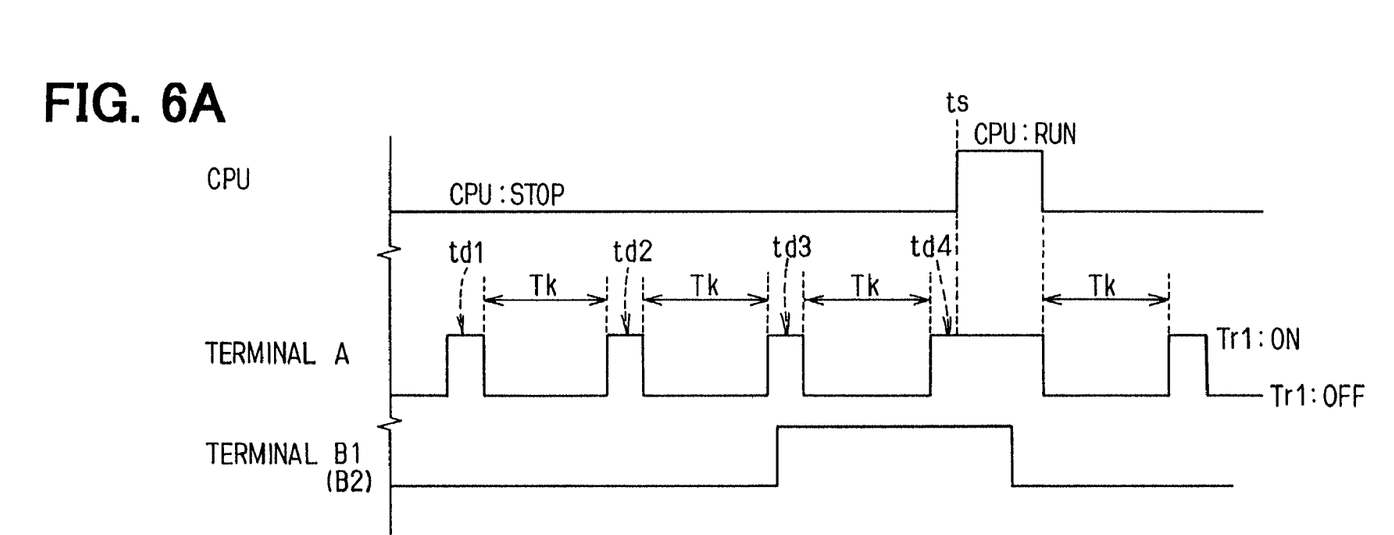
FIG. 6A is a graph showing an operating condition of the microcomputer depending on the second embodiment of the present invention.
Figure 6B:
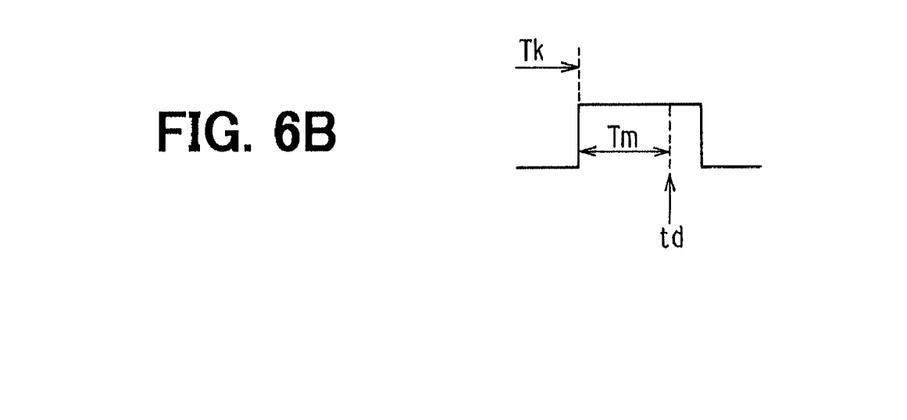
FIG. 6B is a graph showing an operating condition of the microcomputer depending on the second embodiment of the present invention.

In this case, the level detecting circuit 170 activates, as shown in FIG. 6B, the power feeding circuit 109 after the signal read interval Tk. Moreover, at the time t1 after the signal read timing period Tm has passed, a signal level is read from the read object terminal for the purpose of determination thereof. Thereafter, output of the power feeding signal is stopped to turn OFF the NPN transistor Tr1.

When the storage section 17g indicates the NO condition of power feeding signal output control function, the level detecting circuit 170 does not perform the power feeding signal output control. The output terminal A is freed from management of the level detecting circuit 170 and may be used for the other purposes.

An example of operations of the level detecting circuit 170 is shown in FIG. 6A. The CPU 3 constitutes a plurality of functional means by executing programs. The CPU 3 executes the initial setting of the level detecting circuit 170 or the like using the setting means 3f. The CPU 3 stops, when the monitor object signal supplied via at least the signal line L1 is not in the low level, the operation thereof, upon determination that it is no longer required to operate any more. When the CPU 3 stops its operation with a stop means 3g, the level detecting circuit 170 once executes in every constant period Tk as shown in FIG. 6A.

While the CPU 3 is in the stop condition, the terminal A is once fed intermittently in every interval Tk from the power feeding circuit 109 to monitor a terminal B1. A signal level of the terminal B1 is detected at a time td. At timings td1, td2, the terminal B1 is in the high level. The condition that the signal line L1 is grounded via a switch or the like and thereby the terminal B1 is in the low level may be detected at timings td3 and td4.

In this embodiment, the particular level is set in the low level. When the low level is continuously detected for two times with the filter process, the signal level in the read result storage section 17a becomes the low level. The level detecting circuit 170 outputs a rise request WD to the intermittent operation control section 15 to start again the operation of main oscillation circuit 9 and raise the CPU 3 to the operating condition. Upon starting the operation, the CPU 3 reads a determining level LV of the monitor object signal from the read result storage section 17a of the level detecting circuit 170 using a reading means 3h. When the CPU 3 can determine that a read level is low with a determining means 3i, it determines that the rise of this time is caused by the monitor object signal having changed to the low level. In this case, a control means 3j performs the predetermined operations pertaining to the monitor object signal, for example, lighting of lamps or the like. FIG. 6A shows transition of the CPU 3 to the operating condition at a time ts after a time td4. Thereafter, the CPU 3 having completed the predetermined processes enters again the stop condition to start again the monitoring of the terminal B1.

While the CPU 3 and the main oscillation circuit 9 which respectively require a particularly large amount of power consumption in the operating condition are in the stop condition, change of the monitor object signal to the low level as the particular level can be detected. Therefore, the signal interlocking function is realized by less power consumption. The level detecting circuit 170 fully shows the filtering effect through the intermittent read operation. In addition, this level detecting circuit 170 executes the filtering process, noise-free characteristic is largely improved without resulting in increase of a processing load of the CPU 3. If sensitivity is considered first here, a value indicating the NO condition of filter process function is written into the storage section 17f.

Moreover, since the microcomputer 2 is provided with the intermittent operation control section 15 and the oscillation control section 11 as a timer rise control means, it can raise the CPU 3 at every timer time and thereby it can improve reliability and stability of the operations by setting a timer time Ti which is longer than the signal read interval Tk.

Figure 7:
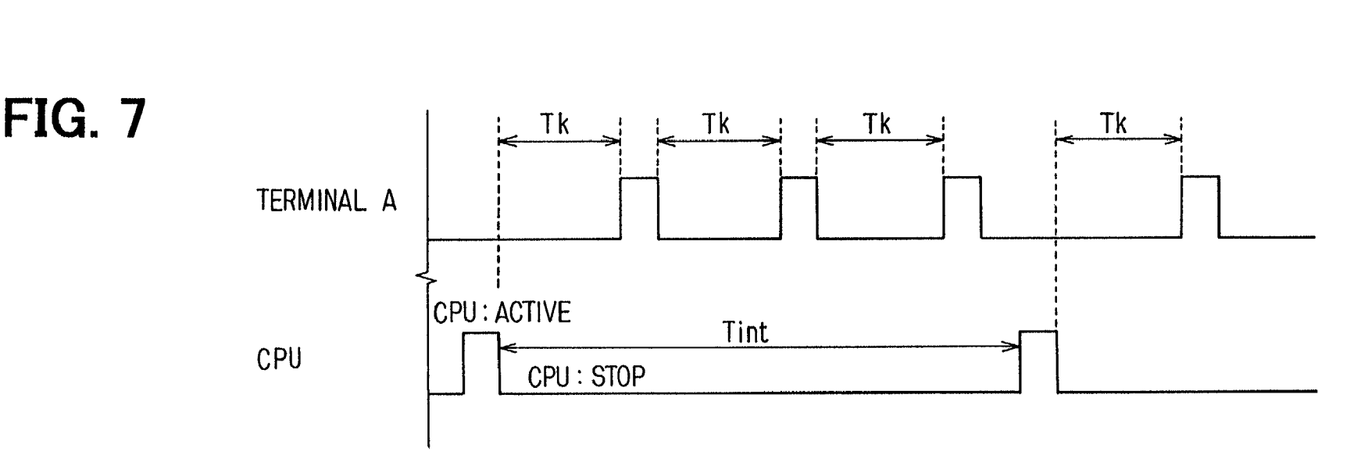
FIG. 7 is a graph showing an operating condition of the microcomputer depending on the second embodiment of the present invention.

The CPU 3 can prevent unstable operation by checking, whenever it rises from the stop condition, the internal data or the like of the microcomputer 2 to execute the process to repair or initialize such data, for example, execution of the setting means 3f. As shown in FIG. 7, the CPU 3 can be started again not depending on the operations of level detecting circuit 170.

Figure 8:
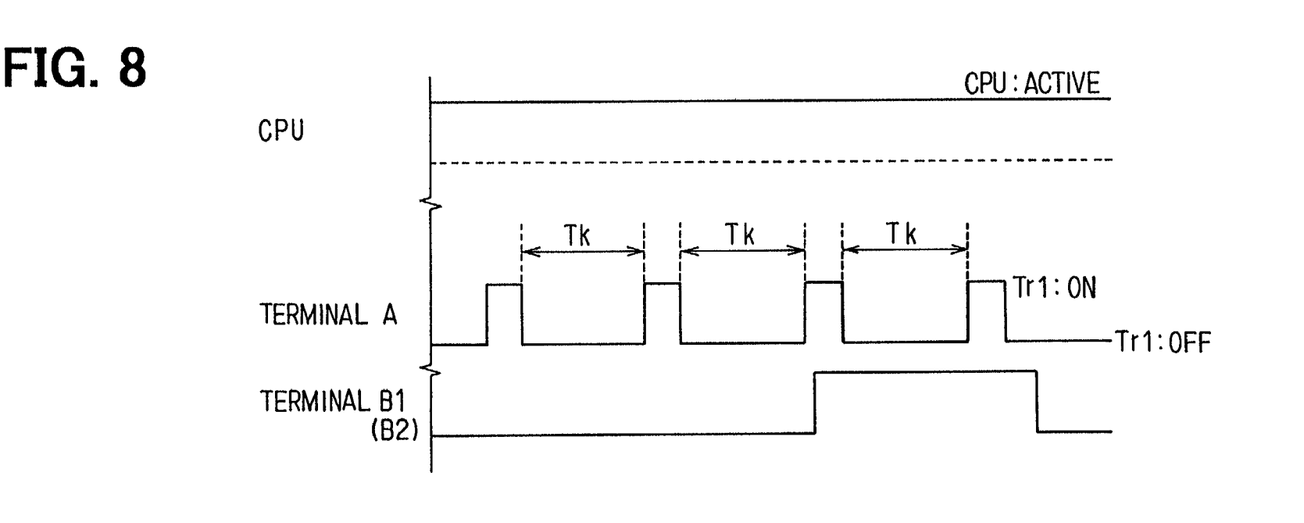
FIG. 8 is a graph showing an operating condition of the microcomputer depending on the second embodiment of the present invention.

In the microcomputer 2 of this embodiment, the level detecting circuit 170 can operate even in the free-running operation mode. Therefore, when the CPU 3 is in the normal operating condition, the level detecting circuit 170 can monitor the level of monitor object signal in place of the CPU 3 and thereby can alleviate a process load of the CPU 3. For example, as shown in FIG. 8, the CPU 3 can read, even in the normal operating condition thereof, the determining level LV of the monitor object signal of the level detecting circuit 170 from the read result storage section 17a in the desired timing by setting the operation mode of the level detecting circuit 170 to the free-running operation mode and then giving an operation command to the level detecting circuit 170.

The level detecting circuit 170 can select the read object terminal with read terminal command information to be stored to the storage section 17b. An input level of the monitor object signal to raise the CPU 3 can be set to any level of the high and low levels depending on the level for storing the signal into the storage section 17e. Whether the power feeding signal output control should be executed or not can be set depending on power feeding signal output control command information to be stored into the storage section 17g.

For example, read terminal command information indicating an input terminal B2 can be stored into the storage section 17b, while a high level can be stored as a particular level to the storage section 17e and a value indicating the NO condition of power feeding signal output control function to the storage section 17g. In this case, a high active signal generated on a signal line L2 connected to an input terminal B2 of the microcomputer 2 is the monitor object signal. When the signal changes to high level from low level, the CPU 3 performs the predetermined operations.

The level detecting circuit 170 can freely set the signal read interval Tk with a value to be stored into the storage section 17c. Moreover, this level detecting circuit 170 can set freely the signal read timing time Tm for the power feeding signal output control depending on a value to be stored into the storage section 17h.

As explained above, the microcomputer 2 surely attains sufficient flexibility by making it possible to set any one item desired. The microcomputer 2 in this embodiment has higher flexibility.

Moreover, the output terminal A for outputting the power feeding signal to the power feeding circuit 109 may be formed assuring free selection from a plurality of terminals. Thereby, flexibility is further improved.

Figure 9:
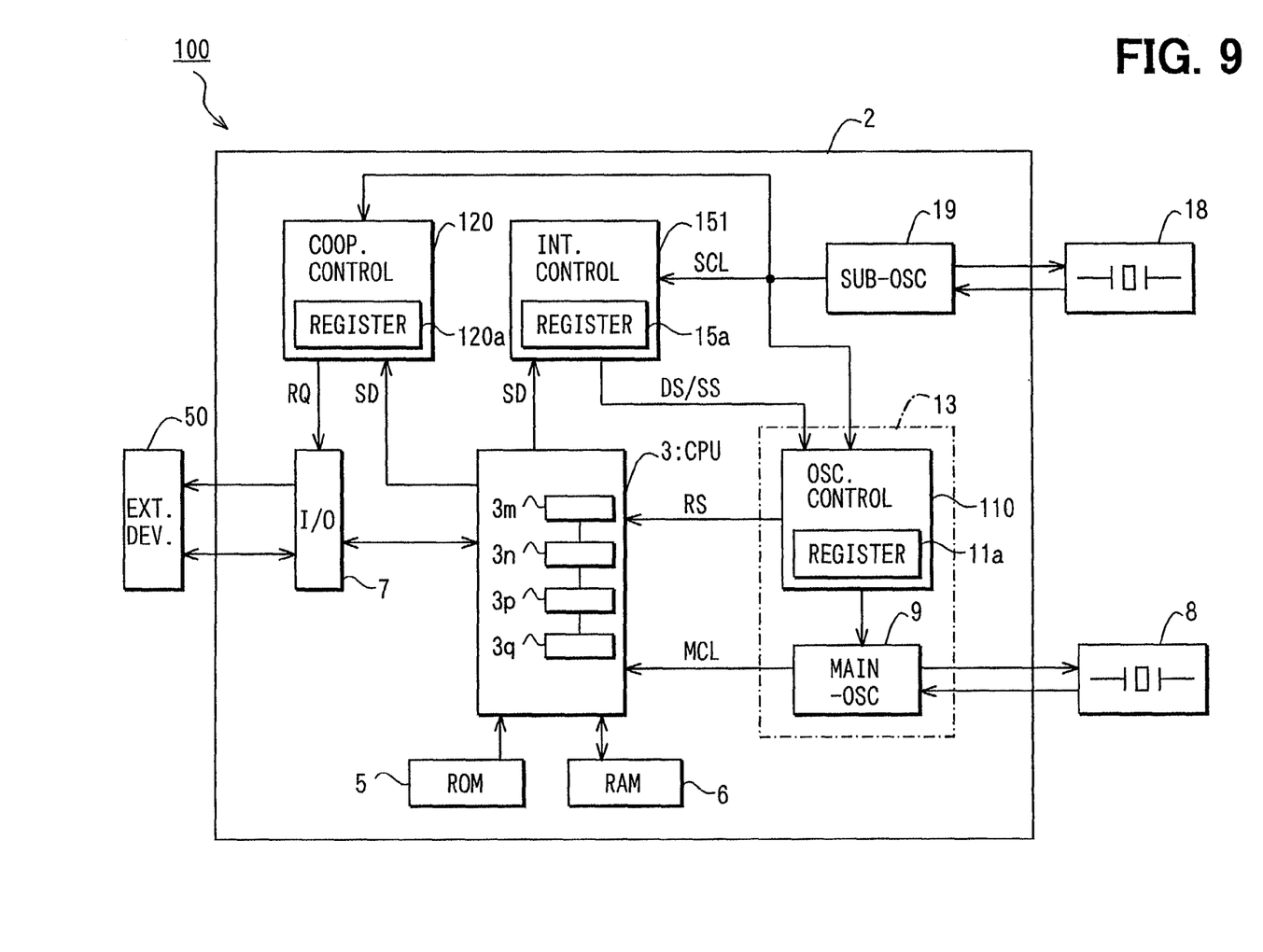
FIG. 9 is a block diagram of the microcomputer depending on a third embodiment of the present invention.
Figure 10:
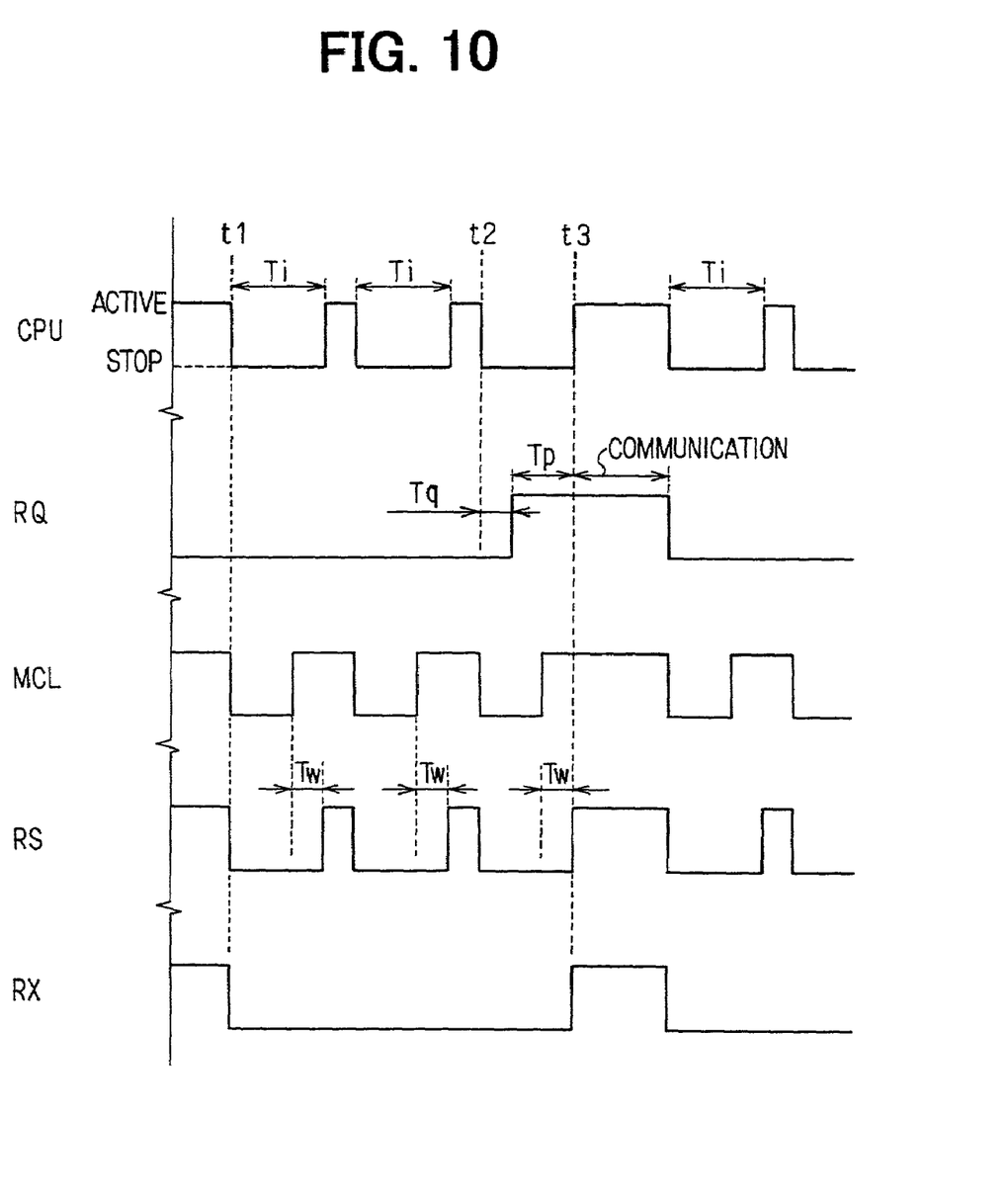
FIG. 10 is a graph showing an operating condition of the microcomputer depending on the third embodiment of the present invention.

A third embodiment will be explained with reference to FIG. 9 and FIG. 10. The elements similar to those of above embodiments are designated by the like reference numerals. In FIG. 10, an ECU 100 provided with a communication function comprises the one-chip type microcomputer 2 and an external apparatus 50 including the communication function. The microcomputer 2 is provided, in addition to the elements of above embodiments, with an intermittent operation control section 151 for intermittently operating the CPU 3 and a timer interlocking control section 120 for outputting a drive signal RQ to the external apparatus 50 conforming to an instruction from the CPU 3. An oscillation control section 110, the intermittent operation control section 151 and timer interlocking control section 120 are operated by receiving a sub-clock which is always generated from the sub-oscillation circuit 19. The CPU 3 outputs, with a stop means 3n, the operation command SD to the intermittent operation control section 151 to stop the operation thereof.

The intermittent operation control section 151 outputs, upon reception of the operation command SD from the CPU 3, the stop instruction SS to the oscillation control section 110 to stop the main oscillation circuit 13 and start the measurement of the setting time Ti being stored to the register 15a. When the setting time Ti has passed, the intermittent operation control section 151 outputs again the operation instruction DS to the oscillation control section 110 to start again the operation of main oscillation circuit 13. The intermittent time Ti may be set as a fixed value.

Upon reception of the operation instruction DS from the intermittent operation control section 151, the oscillation control section 110 outputs, to the CPU 3, the RUN signal RS to raise this CPU 3 to the operating condition from the stop condition when the predetermined oscillation wait time Tw to result in the stable frequency of the main-clock from the time of such reception has passed. This oscillation wait time Tw is stored to the register 11a with the CPU 3. Moreover, this oscillation wait time Tw is prepared for raising the CPU 3 after the main-clock frequency is surely stabilized and is measured on the basis of the number of sub-clocks.

The timer interlocking control section 120 is provided with a register 120a which is stored by the CPU 3. To this register 120a, a time Tq until the output of the drive signal RQ to the external apparatus 50 from reception of the operation command SD from the CPU 3 is set. When the timer interlocking control section 120 receives the operation command SD from the CPU 3, it outputs the drive signal RQ to the external apparatus 50 via the I/O port 7 after the setting time Tq being stored to the register 120a has passed. This setting time is set to such a period in which the CPU 3 will perform the operations for the predetermined number of times after it has started the intermittent operation. A preparation time Tp until the end of preparation for process of the external apparatus 50 from output of the drive signal RQ is obtained previously from the experiments. The setting time Tq is usually set to such a time in which the external apparatus 50 completes the preparation for process when the CPU 3 rises to the operating condition from the stop condition. This setting time Tq is measured on the basis of the number of sub-clocks (namely, the frequency thereof).

The CPU 3 constitutes a plurality of functional means by executing programs. The CPU 3 realizes the initialization with an initializing means 3m. The CPU 3 stops the operation thereof, upon determination that it is possible to stop the operation with a stop means 3n and outputs the operation command SD to the intermittent operation control section 151. Simultaneously, the CPU 3 outputs the operation command SD to the timer interlocking control section 120. Upon reception of the RUN signal RS, the CPU 3 rises to the operating condition from the stop condition with a drive means 3p. As a result, the intermittent operation of the CPU 3 is performed. Moreover, the CPU 3 constitutes a communication means 3q to execute the communication process using the external apparatus 50.

An example of operation of the microcomputer 2 will be explained with reference to FIG. 10. FIG. 10 shows an example wherein the next communication process is started in synchronization with the third rise of the CPU 3 after it has shifted to the intermittent operation mode after completion of the preceding communication process.

The CPU 3 operates the intermittent operation control section 151, at the time t1, when it has completed the preceding communication process, to shift this section to the intermittent operation mode. Thereafter, the intermittent operation is executed for two times. At the time t2 when the second operation period comes to the end, the setting time Tq is set to the register 120a of the timer interlocking control section 120 and the operation command SD is outputted.

The timer interlocking control section 120 starts, upon reception of the operation command SD from the CPU 3, the measurement of the setting time Tq. When a time Tq has passed, the drive signal RQ is outputted to the external apparatus 50 via the I/O port 7. With this drive signal RQ, the external apparatus 50 prepares for communication and completes the preparation for process when the CPU 3 realizes the third rise. The CPU 3 executes the communication process immediately after the third rise thereof at the time t3.

Thereby, the CPU 3 can execute the object communication process without any waiting time. Therefore, a longer stop time of the CPU 3 can be prepared and thereby power consumption is reduced. Since the timer interlocking control section 120 outputs the drive signal RQ, power consumption is reduced by a simplified structure without requirement for setting of the output timing of the drive signal with a software. The intermittent operation control section 151 corresponds to an intermittent operation control means, while the timer interlocking control section 120 corresponds to a timer interlocking control means.

Although the present invention has been described in accordance with the preferred embodiments thereof with reference to the accompanying drawings, it is to be noted that various changes and modifications will be apparent to those skilled in the art. Such changes and modifications are to be understood as being included within the scope of the present invention as defined in the appended claims.

What is claimed is:

1. A microcomputer comprising:
a central processing unit (CPU) which operates depending on programs to output a stop command when it stops operation thereof;
a main-clock generating means for generating a main-clock to operate the CPU;
a sub-clock generating means for generating a sub-clock of the frequency which is lower than the main-clock;
an intermittent operation control means which operates by receiving the sub-clock to control the intermittent operation of the CPU and stops, upon reception of the stop command, operation of the main-clock generating means and starts measurement of the predetermined setting time and starts again, after the setting time has passed, operation of the main-clock generating means to raise the CPU to the operating condition from the stop condition in view of realizing the intermittent operation of the CPU; and
an intermittent time measuring means which operates to measure an intermittent time which is a substantial pause period of the CPU,
wherein the CPU is configured to:
read the intermittent time measured by the intermittent time measuring means;
measure, using its own software process, an operation time in which the CPU is in the operating condition; and
measure a total time from a start time of the intermittent operation of the CPU by accumulating the intermittent time and the operation time.

2. A microcomputer according to claim 1, wherein the intermittent time measuring means is structured to be set, with an operation mode switching command from the CPU, to any operation mode of a first mode to measure a period in which the CPU is in the stop condition and a second mode to continuously measure the time and to clear the measured value with a clear command from the CPU when at least the operation mode is set to the second mode.

3. A microcomputer comprising:
a CPU which can operate depending on programs and can stop the operation thereof with execution of a predetermined instruction;
a main clock generator generating a main clock to operate the CPU;
a sub-clock generator generating a sub-clock of a lower frequency than the main clock;
an intermittent operation controller which operates by receiving the sub-clock to control the intermittent operation of the CPU and stops, upon reception of a stop command, operation of the main clock generator and starts a measurement of a predetermined setting time and moreover starts again, after the predetermined setting time has passed, operation of the main-clock generator to raise the CPU to the operation condition from the stop condition in view of the realizing the intermittent operation of the CPU;
a level detecting circuit reading and determining, when the CPU is in the stop condition, a level of a monitor object signal supplied to a predetermined input terminal of the microcomputer in every constant period and then raising the CPU to the operating condition from the stop condition when the determined level reaches a particular level; and
an automatic signal reading means for reading and determining, when the CPU is in the stop condition, a level of the monitor object signal supplied to the predetermined input terminal of the microcomputer in every constant period and then raising the CPU to the operating condition from the stop condition when the determined level reaches the particular level,
wherein the intermittent operation controller starts the operation of the main-clock generator and the CPU even in the case where a rise request is issued from the level detecting circuit during the measurement of the predetermined setting time.

4. A microcomputer according to claim 3, wherein the automatic signal reading means updates the determined level of the monitor object signal to the level read this time only when the level read from the input terminal becomes identical continuously for a plurality of predetermined times.

5. A microcomputer according to claim 4, wherein the automatic signal reading means can be switched to an operation mode for executing a filter process depending on a command from the CPU and an operation mode for setting the level read from the input terminal as the determined level of the monitor object signal without execution of the filter process.

6. A microcomputer according to claim 3, wherein the particular level is set by the CPU in the automatic signal reading means.

7. A microcomputer according to claim 3, wherein the constant time is set by the CPU in the automatic signal reading means.

8. A microcomputer according to claim 3, wherein the automatic signal reading means outputs from the predetermined output terminal of the microcomputer, before reading a level of the monitor object signal from the input terminal, a power feeding signal to supply a voltage to a pull-up resistor for pulling up a signal line for supplying the monitor object signal to the input terminal and stops output of the power feeding signal when the level of the monitor object signal is read from the input terminal.

9. A microcomputer according to claim 8, wherein a waiting time until level reading of the monitor object signal from output of the power feeding signal is set by the CPU in the automatic signal reading means.

10. A microcomputer according to claim 8, wherein the automatic signal reading means can be set, depending on a command from the CPU, to an operation mode in which the power feeding signal output control is not executed.

11. A microcomputer according to claim 3, wherein an input terminal with which the automatic signal reading means reads a signal level is set by the CPU to any one of a plurality of terminals of the microcomputer.

12. A microcomputer according to claim 3, further comprising a timer rise control means for starting, upon reception of an operation request from the CPU, measurement of time which is previously set by the CPU and then raising the CPU, when such preset time has passed, to the operating condition from the stop condition.

13. A microcomputer according to claim 3, wherein the automatic signal reading means comprises a read result storage section which stores the level of the monitor object signal determined therewith and allows the CPU to read the stored content.

14. A microcomputer according to claim 13, wherein the automatic signal reading means can operate with a command from the CPU while the CPU is in the operating condition.

15. A microcomputer which cooperates with an external apparatus to be driven by a drive signal, comprising:
 a CPU to execute the process in relation to the external apparatus;
 a main clock generator generating a main clock to operate the CPU;
 a sub-clock generator generating a sub-clock of a lower frequency than the main
 an intermittent operation control means for controlling intermittent operation of the CPU, by receiving the sub-clock to control the intermittent operation of the CPU and stops, upon reception of a stop command, operation of the main clock generator and starts a measurement of a predetermined setting time and moreover starts again, after the predetermined setting time has passed, operation of the main-clock generator to raise the CPU to the operation condition from the stop condition in view of realizing the intermittent operation of the CPU; and
 a timer interlocking control means receiving the sub-clock to operate, and for outputting the drive signal to the external apparatus depending on the predetermined setting time.

16. A microcomputer according to claim 15, wherein the intermittent operation control means operates by receiving a sub-clock in the frequency lower than that of a main-clock for operating the CPU.

17. A microcomputer according to claim 15, wherein the timer interlocking control means operates by receiving the sub-clock in the frequency lower than that of the main-clock for operating the CPU.

18. A microcomputer according to claim 15, wherein the setting time is set for the timer interlocking control means while the CPU is in the operating condition.

19. A microcomputer according to claim 15, wherein the setting time is set enough for the external apparatus to complete preparation for process when the CPU rises to the operating condition from the stop condition.

* * * * *